(12) United States Patent
Chen et al.

(10) Patent No.: US 9,760,202 B2
(45) Date of Patent: Sep. 12, 2017

(54) TOUCH IDENTIFICATION DEVICE ON THE BASIS OF DOPPLER EFFECT, TOUCH IDENTIFICATION METHOD ON THE BASIS OF DOPPLER EFFECT AND TOUCH SCREEN

(71) Applicant: BOE TECHNOLOGY GROUP CO., LTD., Beijing (CN)

(72) Inventors: Yanshun Chen, Beijing (CN); Hong Wang, Beijing (CN); Yaohui Li, Beijing (CN); Qiushi Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 86 days.

(21) Appl. No.: 14/439,335

(22) PCT Filed: Aug. 29, 2014

(86) PCT No.: PCT/CN2014/085480
§ 371 (c)(1),
(2) Date: Apr. 29, 2015

(87) PCT Pub. No.: WO2015/165186
PCT Pub. Date: Nov. 5, 2015

(65) Prior Publication Data
US 2016/0274714 A1    Sep. 22, 2016

(30) Foreign Application Priority Data

Apr. 28, 2014 (CN) .......................... 2014 1 0175591

(51) Int. Cl.
*G06F 3/041* (2006.01)
*G06F 3/046* (2006.01)
*G06F 3/042* (2006.01)

(52) U.S. Cl.
CPC ............ *G06F 3/0416* (2013.01); *G06F 3/042* (2013.01); *G06F 3/046* (2013.01)

(58) Field of Classification Search
CPC .... G06F 3/0421; G06F 3/0423; G06F 3/0425; G06F 3/0426; G06F 3/0428; G06F 3/043; G06F 3/0436
See application file for complete search history.

(56) References Cited

U.S. PATENT DOCUMENTS

2001/0028344 A1* 10/2001 Iwamoto ............... G06F 3/0423
                                                                    345/175
2002/0033805 A1*  3/2002 Fujioka ................. G06F 3/0421
                                                                    345/175
(Continued)

FOREIGN PATENT DOCUMENTS

CN          102184060 A        9/2011
CN          103038725 A        4/2013
(Continued)

OTHER PUBLICATIONS

Office action issued in corresponding Korean application No. 10-2015-7012705 dated Apr. 11, 2016.
(Continued)

*Primary Examiner* — Nalini Mummalaneni
(74) *Attorney, Agent, or Firm* — Nath, Goldberg & Meyer; Joshua B. Goldberg (57) ABSTRACT

The present invention discloses a touch identification device on the basis of Doppler effect, a touch identification method on the basis of Doppler effect and a touch screen, wherein the touch identification device comprises: a first transceiving module used for transmitting a first detection wave along a first direction and receiving a first feedback wave formed from the first detection wave after being reflected by a touch body; a second transceiving module used for transmitting a second detection wave along a second direction and receiv- (Continued)

ing a second feedback wave formed from the second detection wave after being reflected by the touch body; and a calculation module used for calculating a moving speed and a moving direction of the touch body at the touch point according to the first detection wave, the first feedback wave, the second detection wave and the second feedback wave.

20 Claims, 2 Drawing Sheets (56) References Cited

U.S. PATENT DOCUMENTS

| | | | |
|---|---|---|---|
| 2002/0104957 A1* | 8/2002 | Liess | G01P 3/366 |
| | | | 250/221 |
| 2004/0104894 A1* | 6/2004 | Tsukada | G06F 1/1616 |
| | | | 345/168 |
| 2011/0181510 A1 | 7/2011 | Hakala et al. | |
| 2011/0248963 A1* | 10/2011 | Lawrence | G03H 1/0005 |
| | | | 345/175 |
| 2012/0176343 A1* | 7/2012 | Holmgren | G06F 3/042 |
| | | | 345/175 |
| 2012/0280900 A1 | 11/2012 | Wang et al. | |
| 2014/0055406 A1* | 2/2014 | Hong | G06F 3/0414 |
| | | | 345/174 |
| 2015/0060641 A1* | 3/2015 | Chen | G06F 3/0421 |
| | | | 250/206.1 |

FOREIGN PATENT DOCUMENTS

| | | |
|---|---|---|
| CN | 103076911 A | 5/2013 |
| CN | 103995637 A | 8/2014 |
| KR | 10-0432529 B1 | 5/2004 |
| KR | 10-0813428 | 3/2008 |

OTHER PUBLICATIONS

Notification of the First Office Action dated Dec. 25, 2014 corresponding to Chinese application No. 201410175591.6.
Notification of the Second Office Action dated Sep. 2, 2015 corresponding to Chinese application No. 201410175591.6.
International Search Report dated Aug. 29, 2014 corresponding to International application No. PCT/CN2014/085480.

* cited by examiner

TOUCH IDENTIFICATION DEVICE ON THE BASIS OF DOPPLER EFFECT, TOUCH IDENTIFICATION METHOD ON THE BASIS OF DOPPLER EFFECT AND TOUCH SCREEN

This is a National Phase Application filed under 35 U.S.C. 371 as a national stage of PCT/CN2014/085480, filed Aug. 29, 2014, an application claiming the benefit of Chinese Application No. 201410175591.6, filed Apr. 28, 2014, the content of each of which is hereby incorporated by reference in its entirety.

FIELD OF THE INVENTION

The present invention relates to the technical field of touch control, and particularly relates to a touch identification device on the basis of Doppler effect, a touch identification method on the basis of Doppler effect and a touch screen.

BACKGROUND OF THE INVENTION

A human-computer interaction technology becomes one of the current most popular research topics, and moreover, the human-computer interaction technology is gradually transferred to be user-centred from being system-centred, whereas identification for the action of a human finger increasingly becomes an important means for human-computer interaction.

At present, there are no related products for identifying the touch action of a human finger on the market.

SUMMARY OF THE INVENTION

The present invention provides a touch identification device on the basis of Doppler effect, a touch identification method on the basis of Doppler effect and a touch screen, capable of making an accurate judgement on the touch action of a touch body at a touch point.

In order to realize the purpose above, the present invention provides a touch identification device on the basis of Doppler effect, comprising:

a first transceiving module used for transmitting a first detection wave along a first direction and receiving a first feedback wave formed from the first detection wave after being reflected by a touch body;

a second transceiving module used for transmitting a second detection wave along a second direction and receiving a second feedback wave formed from the second detection wave after being reflected by the touch body, an arrival angle from the first direction to the second direction being a predetermined angle, and moreover, the first direction and the second direction being intersected at the touch point of the touch body; and a calculation module connected with the first transceiving module and the second transceiving module, and used for calculating a moving speed and a moving direction of the touch body at the touch point according to the first detection wave, the first feedback wave, the second detection wave and the second feedback wave.

Optionally, the first detection wave and the second detection wave are both electromagnetic waves;

the calculation module is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, an included angle $\theta_1$ when the first direction is anticlockwise rotated to the moving direction, and an included angle $\theta_2$ when the moving direction is anticlockwise rotated to the second direction;

if the calculation module judges that the calculated $\theta_1$ or $\theta_2$ is a negative value, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, an included angle $\theta_1$ when the first direction is anticlockwise rotated to the moving direction, and an included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

Optionally, the first detection wave and the second detection wave are both electromagnetic waves;

the calculation module is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, an included angle $\theta_1$ when the first direction is anticlockwise rotated to the moving direction, and an included angle $\theta_2$ when the moving direction is anticlockwise rotated to the second direction;

if the calculation module judges that $\theta_1$ or $\theta_2$ is a greater than 360 degrees, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, an included angle $\theta_1$ when the first direction is anticlockwise rotated to the moving direction, and an included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

Optionally, the electromagnetic waves are microwaves or optical waves.

Optionally, the predetermined angle is equal to 90 degrees.

The present invention further provides a touch screen comprising one or more touch identification devices above.

Optionally, the touch screen contains a plurality of touch identification devices, each of the touch identification devices corresponds to one touch point, and all the touch points are uniformly distributed on the touch screen.

In order to realize the purpose above, the present invention further provides a touch identification method on the basis of Doppler effect, comprising:

transmitting a first detection wave along a first direction, and receiving a first feedback wave formed from the first detection wave after being reflected by a touch body, by a first transceiving module;

transmitting a second detection wave along a second direction, and receiving a second feedback wave formed from the second detection wave after being reflected by the touch body, by a second transceiving module, an arrival angle from the first direction to the second direction being a predetermined angle, and the first direction and the second direction being intersected at the touch point of the touch body; and calculating a moving speed and a moving direction of the touch body at the touch point according to the first detection wave, the first feedback wave, the second detection wave and the second feedback wave by a calculation module connected with the first transceiving module and the second transceiving module.

Optionally, the first detection wave and the second detection wave are both electromagnetic waves;

the step of calculating the moving speed and the moving direction of the touch body at the touch point according to the first detection wave, the first feedback wave, the second detection wave and the second feedback wave by the calculation module connected with the first transceiving module and the second transceiving module comprises:

the calculation module is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, an included angle $\theta_1$ when the first direction is anticlockwise rotated to the moving direction, and an included angle $\theta_2$ when the moving direction is anticlockwise rotated to the second direction;

the calculation module judges whether $\theta_1$ and $\theta_2$ are negative values, if the calculation module judges that the $\theta_1$ or $\theta_2$ is a negative value, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, an included angle $\theta_1$ when the first direction is anticlockwise rotated to the moving direction, and an included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

Optionally, the first detection wave and the second detection wave are both electromagnetic waves;

the step of calculating the moving speed and the moving direction of the touch body at the touch point according to the first detection wave, the first feedback wave, the second detection wave and the second feedback wave by the calculation module connected with the first transceiving module and the second transceiving module comprises:

the calculation module is used for, according to the following formula:

$$f_3 = f_1 * \frac{\sqrt{1-\frac{v^2}{c^2}}}{1+\frac{v*\cos\theta_1}{c}};$$

$$f_4 = f_2 * \frac{\sqrt{1-\frac{v^2}{c^2}}}{1+\frac{v*\cos\theta_2}{c}}; \text{ and}$$

$$\theta_1 + \theta_2 = \theta_0 + 360°;$$

calculating the moving speed v, an included angle $\theta_1$ when the first direction is anticlockwise rotated to the moving direction, and an included angle $\theta_2$ when the moving direction is anticlockwise rotated to the second direction;

the calculation module judges whether $\theta_1$ and $\theta_2$ are greater than 360 degrees, if the calculation module judges that $\theta_1$ or $\theta_2$ is greater than 360 degrees, then the calculation module determines that the calculated $\theta_1$ and $\theta_2$ are invalid calculation results, and is used for, according to the following formula:

$$f_3 = f_1 * \frac{\sqrt{1-\frac{v^2}{c^2}}}{1+\frac{v*\cos\theta_1}{c}};$$

$$f_4 = f_2 * \frac{\sqrt{1-\frac{v^2}{c^2}}}{1+\frac{v*\cos\theta_2}{c}};$$

$$\theta_1 + \theta_2 = \theta_0.$$

calculating the moving speed v, an included angle $\theta_1$ when the first direction is anticlockwise rotated to the moving direction, and an included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

Optionally, the electromagnetic waves are microwaves or optical waves.

Optionally, the predetermined angle is equal to 90 degrees.

The present invention has the following beneficial effects:

The present invention provides a touch identification device on the basis of Doppler effect, a touch identification method on the basis of Doppler effect and a touch screen, wherein the touch identification device comprises a first transceiving module, a second transceiving module and a calculation module, the first transceiving module is used for transmitting a first detection wave along a first direction and receiving a first feedback wave formed from the first detection wave after being reflected by a touch body; the second transceiving module is used for transmitting a second detection wave along a second direction and receiving a second feedback wave formed from the second detection wave after being reflected by the touch body; the calculation module is used for calculating a moving speed and a moving direction of the touch body at the touch point according to the first detection wave, the first feedback wave, the second detection wave and the second feedback wave, and according to the technical solutions of the present invention, the moving speed and the moving direction of the touch body at the touch point are solved by arranging a group of (two) transceiving devices, and on the basis of the formula of Doppler effect, thus realizing an accurate judgement on the touch action of the touch body.

DETAILED DESCRIPTION OF THE EMBODIMENTS

For better understanding of a person skilled in the art for the technical solutions of the present invention, the touch identification device on the basis of Doppler effect, the touch identification method on the basis of Doppler effect and the touch screen, provided by the present invention will be described below in details in conjunction with the accompanying diagrams.

Figure 1:
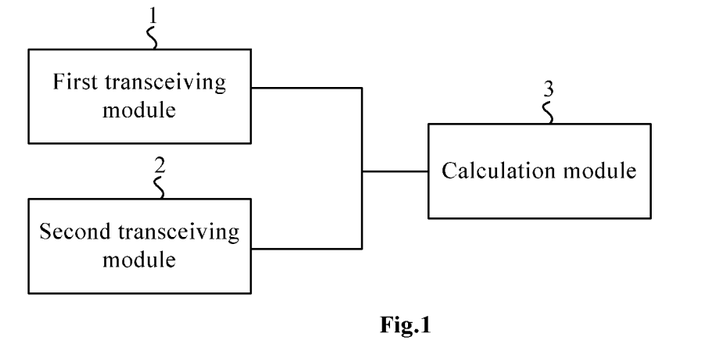
FIG. 1 is a structural diagram of a touch identification device of the first embodiment of the present invention.

FIG. 1 is a structural diagrammatic diagram of a touch identification device of the first embodiment of the present invention, as shown in FIG. 1, the identification process of the touch identification device is on the basis of Doppler effect, the touch identification device comprises: a first transceiving module 1 used for transmitting a first detection wave along a first direction and receiving a first feedback wave formed generated from after the first detection wave after is being reflected by a touch body; a second transceiving module 2 used for transmitting a second detection wave along a second direction and receiving a second feedback wave formed from the second detection wave after being reflected by the touch body; a calculation module 3 used for calculating the moving speed and the moving direction of the touch body at the touch point according to the first detection wave, the first feedback wave, the second detection wave and the second feedback wave. The calculation module 3 is connected to the first transceiving module 1 and the second transceiving module 2, an arrival angle from the first direction to the second direction is a predetermined angle, and moreover, the first direction and the second direction are intersected at the touch point of the touch body. The touch identification device is capable of identifying the touch action of the touch body at a corresponding touch point.

It should be noted that, the touch body in the present invention may be a human finger or a device with a touch function, such as a touch pen.

In the embodiment, the first detection wave and the second detection wave are electromagnetic waves, the electromagnetic waves preferably are microwaves or optical waves, and the case that the first detection wave and the second detection wave are microwaves will be illustrated below in details in conjunction with the accompanying diagrams. It should be noted that, the moving speed calculated by the calculation module 3 is v, the moving direction calculated by the calculation module 3 is embodied by virtue of the first direction and the second direction, specifically, an included angle $\theta_1$ when the first direction is anticlockwise rotated to the moving direction or an included angle $\theta_2$ when the moving direction is anticlockwise rotated to the second direction is calculated, and then the orientation of the moving direction may be obtained.

The identification process of the touch identification device provided by the present invention will be described below in details in conjunction with the accompanying diagrams, and the process is approximately as follows:

the first transceiving module 1 transmits a first detection wave with a frequency $f_1$ along a first direction, the first detection wave moves to the touch point and then forms a first feedback wave with a frequency $f_3$ by virtue of the reflecting action of the touch body, the first feedback wave moves along a direction opposite to the first direction, and the first feedback wave is received by the first transceiving module 1.

The frequency $f_3$ of the first feedback wave meets:

$$f_3 = f_1 * \frac{\sqrt{1 - \frac{v^2}{c^2}}}{1 + \frac{v * \cos\theta_1}{c}} \quad (1)$$

meanwhile, the second transceiving module 2 transmits a second detection wave with a frequency $f_2$ along a second direction, the second detection wave moves to the touch point and then forms a second feedback wave with a frequency $f_4$ by virtue of the reflecting action of the touch body, the second feedback wave moves along a direction opposite to the second direction, and the second feedback wave is received by the second transceiving module 2.

The frequency $f_4$ of the second feedback wave meets:

$$f_4 = f_2 * \frac{\sqrt{1 - \frac{v^2}{c^2}}}{1 + \frac{v * \cos\theta_2}{c}} \quad (2)$$

In addition, the relationship among the included angle $\theta_1$ when the first direction is anticlockwise rotated to the moving direction, the included angle $\theta_2$ when the moving direction is anticlockwise rotated to the second direction, and a predetermined angle $\theta_0$ meets:

$$\theta_1 + \theta_2 = \theta_0 \quad (3)$$

or, $$\theta_1 + \theta_2 = \theta_0 + 360° \quad (4)$$

Figure 2:
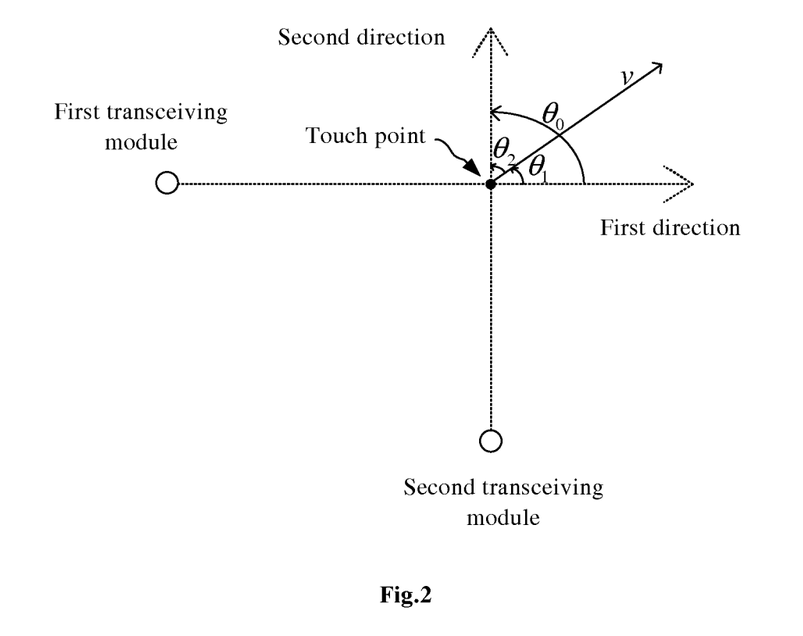
FIG. 2 is a diagram of the moving direction of a touch body between a first direction and a second direction.
Figure 3:
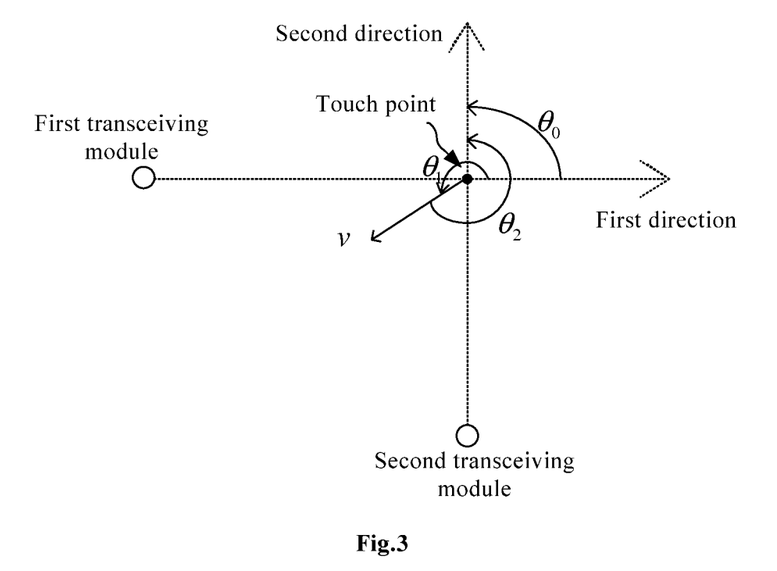
FIG. 3 is a diagram of the moving direction of a touch body, which is not between the first direction and the second direction.

The relationship among $\theta_1$, $\theta_2$ and $\theta_0$ will be described below in details in conjunction with the accompanying diagrams. FIG. 2 is a diagram of the moving direction of the touch body between the first direction and the second direction, FIG. 3 is a diagram of the moving direction of the touch body, which is not between the first direction and the second direction, as shown in FIG. 2 and FIG. 3, the first direction is the direction in which the first transceiving module points to the touch point, and the second direction is the direction in which the second transceiving module points to the touch point.

When the moving direction is between the first direction and the second direction, see FIG. 2, it may be seen that, $\theta_1$, $\theta_2$ and $\theta_0$ meet: $\theta_1 + \theta_2 = \theta_0$; when the moving direction is not between the first direction and the second direction, see FIG. 3, it may be seen that, $\theta_1$, $\theta_2$ and $\theta_0$ meet: $\theta_1 + \theta_2 = \theta_0 + 360°$.

When the calculation module 3 is used for calculating, the principle thereof is as follows: during the calculation process of the calculation module 3, the calculation module is used for calculating by adopting the formulas (1), (2) and (3) above simultaneously in a default manner, and then judging the positive and negative characteristics of the values of the calculated $\theta_1$ and $\theta_2$. Specifically as follows, if the real moving direction of the touch body is between the first direction and the second direction (the case shown in FIG. 2), then the $\theta_1$ and $\theta_2$ calculated by the calculation module 3 by adopting the formulas (1), (2) and (3) above simultaneously are certainly positive values, then the calculation module judges that the calculated $\theta_1$ and $\theta_2$ are both positive values, in this case, the calculation module 3 directly outputs the positive $\theta_1$ and $\theta_2$ and does not calculate by adopting the formulas (1), (2) and (4) above simultaneously any more; if the real moving direction of the touch body is not between the first direction and the second direction (the case shown in FIG. 3), then in the $\theta_1$ and $\theta_2$ calculated by the calculation module 3 by adopting the formulas (1), (2) and (3) above simultaneously, one is certainly a positive value, and the other one is a negative value, the calculation module judges that $\theta_1$ or $\theta_2$ is the negative value, the calculation module 3 determines that the $\theta_1$ and $\theta_2$ calculated by the calculation module 3 by adopting the formulas (1), (2) and (3) above simultaneously are invalid results, in this case, the calculation module 3 recalculates the $\theta_1$ and $\theta_2$ and the moving speed v by adopting the formulas (1), (2) and (4) above simultaneously, and outputs the calculated results obtained by adopting the formulas (1), (2) and (4) above simultaneously.

Of course, in the embodiment, the calculation module may also calculate by adopting the formulas (1), (2) and (4) above simultaneously in a default manner, and then judge whether the values of the calculated $\theta_1$ and $\theta_2$ are greater than 360 degrees. The specific process is as follows: if the real moving direction of the touch body at this moment is between the first direction and the second direction (the case shown in FIG. 2), then in the $\theta_1$ and $\theta_2$ calculated by the calculation module 3 by adopting the formulas (1), (2) and (4) above simultaneously, one is certainly greater than 360 degrees, and the other one is less than $\theta_0$, then the calculation module judges that $\theta_1$ or $\theta_2$ is greater than 360 degrees, the calculation module 3 determines that the calculated results obtained by adopting the formulas (1), (2) and (4) above simultaneously are invalid, in this case, the calculation module 3 recalculates the $\theta_1$ and $\theta_2$ and the moving speed v by adopting the formulas (1), (2) and (3) above simultaneously, and outputs the calculated results obtained by adopting the formulas (1), (2) and (3) above simultaneously. If the real moving direction of the touch body is not between the first direction and the second direction (the case shown in FIG. 3), then the $\theta_1$ and $\theta_2$ calculated by the calculation module 3 by adopting the formulas (1), (2) and (4) above simultaneously are both less than 360 degrees, in this case, the calculation module 3 directly outputs $\theta_1$ and $\theta_2$ with the valves which are less than 360 degrees, and does not calculate by adopting the formulas (1), (2) and (3) above simultaneously any more.

It should be noted that, in FIG. 2 and FIG. 3, preferably, the value of the predetermined angle $\theta_0$ is 90 degrees, and facilitates the calculation process of the calculation module 3.

If the value of the solved moving speed v is equal to 0, then the touch body has no moving speed at the touch point, that is, the touch action of the touch body is point contact; if the value of the solved moving speed v is unequal to 0, then the touch body has a moving speed at the touch point, that is, the touch action of the touch body is slide contact, and the moving direction of the slide contact may be determined by $\theta_1$ and the first direction or by $\theta_2$ and the second direction.

In the embodiment, both of the first detection wave and the second detection wave may also be optical waves, and the touch identification process is as follows:

when the first transceiving module 1 receives the first feedback wave, the frequency $f_3$ of the first feedback wave meets:

$$f_3 = f_1 * \frac{\sqrt{1 - \frac{v^2}{c_0^2}}}{1 + \frac{v * \cos\theta_1}{c_0}} \quad (5)$$

when the second transceiving module 2 receives the second feedback wave, the frequency $f_4$ of the second feedback wave meets:

$$f_4 = f_2 * \frac{\sqrt{1 - \frac{v^2}{c_0^2}}}{1 + \frac{v * \cos\theta_2}{c_0}} \quad (6)$$

meanwhile, the relationship among the included angle $\theta_1$ when the first direction is anticlockwise rotated to the moving direction, the included angle $\theta_2$ when the moving direction is anticlockwise rotated to the second direction, and the predetermined angle $\theta_0$ meets:

$$\theta_1 + \theta_2 = \theta_0 \quad (7)$$

or, $$\theta_1 + \theta_2 = \theta_0 + 360° \quad (8)$$

wherein during a simultaneous calculation process, the formulas (5), (6) and (7) may be selected in a default manner for calculation, or the formulas (5), (6) and (8) may be selected in a default manner for calculation. The specific mode may see the description above for the case that the electromagnetic waves are microwaves, which will not be described redundantly here.

Wherein, in the formula (5) and the formula (6), the frequency $f_3$ of the first feedback wave may be detected by the first transceiving module 1, and the frequency $f_4$ of the second feedback wave may be detected by the second transceiving module 2. $c_0$ is the transmission speed of optical waves, $f_1$ is the frequency of the first detection wave, $f_2$ is the frequency of the second detection wave, and $f_1$ is unequal to $f_2$.

It should be noted that, in the embodiment, when the first detection wave is a microwave, and the second detection wave is an optical wave, the moving speed v, the included angle $\theta_1$ when the first direction is anticlockwise rotated to the moving direction or the included angle $\theta_2$ when the second direction is anticlockwise rotated to the moving direction may be solved by adopting the formulas (1), (6) and (7) above or the formulas (1), (8) and (8) above simultaneously; and when the first detection wave is an optical wave, and the second detection wave is a microwave, the moving speed v, the included angle $\theta$ when the first direction is anticlockwise rotated to the moving direction or the included angle $\theta_2$ when the second direction is anticlockwise rotated to the moving direction may be solved by adopting the formulas (2), (5) and (7) above or the formulas (2), (5) and (8) above simultaneously.

From this, according to the first embodiment of the present invention, the moving speed and the moving direction of the touch body at the touch point are solved by arranging a group of (two) transceiving devices, and on the basis of the formula of Doppler effect, thus realizing an accurate judgement on the touch action of the touch body.

The second embodiment of the present invention provides a touch screen comprising the touch identification device of the first embodiment above, and specifically may see descriptions in the first embodiment above, which will not be described redundantly here.

The touch identification device provided by the first embodiment is arranged on the touch screen, therefore, the touch screen is capable of making an accurate judgement on the touch action of the touch body, thus enhancing the capacity of human-computer interaction of the touch screen, and enabling the touch screen to be more intelligent.

It may be known from the first embodiment that, each identification device corresponds to one touch point, therefore, during actual production, a plurality of touch identification devices may be arranged on the touch screen, thus a judgement on the touch actions of touch bodies at a plurality of positions on the touch screen can be realized. As a preferred solution, when a plurality of touch identification devices are provided, all the touch points are uniformly distributed on the touch screen.

Figure 4:
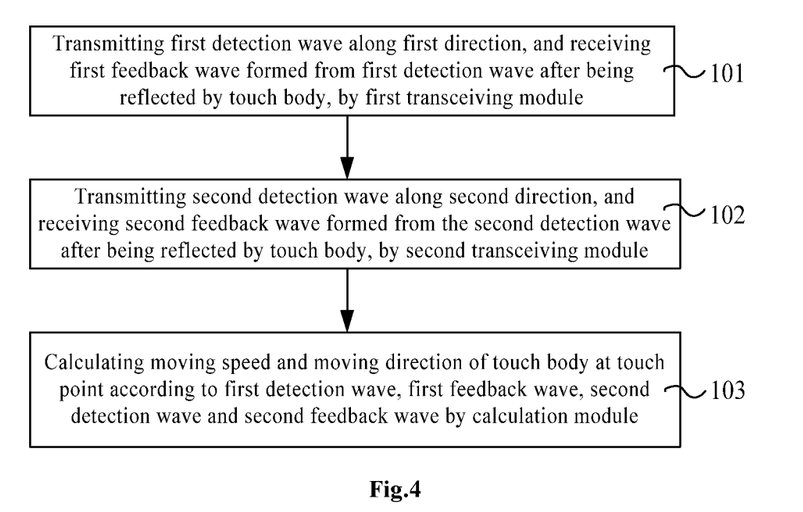
FIG. 4 is a flow diagram of a touch identification method on the basis of Doppler effect of the present invention.

FIG. 4 is a flow diagram of a touch identification method on the basis of Doppler effect of the present invention. As shown in FIG. 4, the touch identification method is on the basis of the touch identification device in the first embodiment, and the method comprises:

step 101: transmitting a first detection wave along a first direction, and receiving a first feedback wave formed from the first detection wave after being reflected by a touch body, by a first transceiving module.

In the step 101, the first transceiving module transmits the first detection wave with a frequency $f_1$ along the first direction, the first detection wave moves to the touch point and then forms the first feedback wave with a frequency $f_3$ by virtue of the reflecting action of the touch body, the first feedback wave moves along a direction opposite to the first direction, and the first feedback wave is received by the first transceiving module.

step 102: transmitting a second detection wave along a second direction, and receiving a second feedback wave formed from the second detection wave after being reflected by a touch body, by a second transceiving module.

In the step 101 and the step 102, an arrival angle from the first direction to the second direction is a predetermined angle, and moreover, the first direction and the second direction are intersected at the touch point of the touch body.

The second transceiving module 2 transmits the second detection wave with a frequency $f_2$ along the second direction, the second detection wave moves to the touch point and then forms a second feedback wave with a frequency $f_4$ by virtue of the reflecting action of the touch body, the second feedback wave moves along a direction opposite to the second direction, and the second feedback wave is received by the second transceiving module.

It should be noted that, in the embodiment, the step 101 and the step 102 may be carried out simultaneously. Meanwhile, the first detection wave in the step 101 and the second detection wave in the step 102 are both electromagnetic waves, and the electromagnetic waves preferably are microwaves or optical waves.

Step 103: calculating the moving speed and the moving direction of the touch body at the touch point according to the first detection wave, the first feedback wave, the second detection wave and the second feedback wave by a calculation module. The calculation process of the step 103 is the same as the working principle of the touch identification device of the first embodiment of the present invention, which will not be described redundantly here.

Similarly, the touch identification method on the basis of Doppler effect of the present invention realizes an accurate judgement on the touch action of a touch body.

It could be understood that, the above embodiments are merely exemplary embodiments adopted for describing the principle of the present invention, and the present invention is not limited thereto. Various variations and improvements may be made for those of ordinary skill in the art without departing from the spirit and essence of the present invention, and these variations and improvements are also interpreted as within the protection scope of the present invention.

The invention claimed is:

1. A touch identification device on the basis of Doppler effect, comprising:
   a first transceiving module used for transmitting a first detection wave along a first direction and receiving a first feedback wave formed from the first detection wave after being reflected by a touch body;
   a second transceiving module used for transmitting a second detection wave along a second direction and receiving a second feedback wave formed from the second detection wave after being reflected by the touch body, an arrival angle from the first direction to the second direction being a predetermined angle, and the first direction and the second direction being intersected at a touch point of the touch body; and
   a calculation module connected with the first transceiving module and the second transceiving module, and used for calculating a moving speed and a moving direction of the touch body at the touch point according to the first detection wave, the first feedback wave, the second detection wave and the second feedback wave,
   wherein the first detection wave and the second detection wave are both electromagnetic waves;
   the calculation module is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, an included angle $\theta_1$ when the first direction is anticlockwise rotated to the moving direction, and an included angle $\theta_2$ when the moving direction is anticlockwise rotated to the second direction;

the calculation module judges whether $\theta_1$ and $\theta_2$ are negative values, if the calculation module judges that $\theta_1$ or $\theta_2$ is a negative value, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, the included angle $\theta_1$ when the first direction is anticlockwise rotated to the moving direction, and the included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

2. The touch identification device on the basis of Doppler effect according to claim 1, wherein the electromagnetic waves are microwaves or optical waves.

3. The touch identification device on the basis of Doppler effect according to claim 1, wherein the predetermined angle is equal to 90 degrees.

4. A touch identification device on the basis of Doppler effect, comprising:
   a first transceiving module used for transmitting a first detection wave along a first direction and receiving a first feedback wave formed from the first detection wave after being reflected by a touch body;
   a second transceiving module used for transmitting a second detection wave along a second direction and receiving a second feedback wave formed from the second detection wave after being reflected by the touch body, an arrival angle from the first direction to the second direction being a predetermined angle, and the first direction and the second direction being intersected at a touch point of the touch body; and
   a calculation module connected with the first transceiving module and the second transceiving module, and used for calculating a moving speed and a moving direction of the touch body at the touch point according to the first detection wave, the first feedback wave, the second detection wave and the second feedback wave,
   wherein the first detection wave and the second detection wave are both electromagnetic waves;
   the calculation module is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, an included angle $\theta_1$ when the first direction is anticlockwise rotated to the moving direction, and an included angle $\theta_2$ when the moving direction is anticlockwise rotated to the second direction;

the calculation module judges whether $\theta_1$ and $\theta_2$ are greater than 360 degrees, if the calculation module judges that $\theta_1$ or $\theta_2$ is greater than 360 degrees, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, the included angle $\theta_1$ when the first direction is anticlockwise rotated to the moving direction, and the included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

5. The touch identification device on the basis of Doppler effect according to claim 4, wherein the electromagnetic waves are microwaves or optical waves.

6. The touch identification device on the basis of Doppler effect according to claim 4, wherein the predetermined angle is equal to 90 degrees.

7. A touch screen comprising one or a plurality of touch identification devices on the basis of Doppler effect, the touch identification device on the basis of Doppler effect comprises:

a first transceiving module used for transmitting a first detection wave along a first direction and receiving a first feedback wave formed from the first detection wave after being reflected by a touch body;

a second transceiving module used for transmitting a second detection wave along a second direction and receiving a second feedback wave formed from the second detection wave after being reflected by the touch body, an arrival angle from the first direction to the second direction being a predetermined angle, and the first direction and the second direction being intersected at a touch point of the touch body; and a calculation module connected with the first transceiving module and the second transceiving module, and used for calculating a moving speed and a moving direction of the touch body at the touch point according to the first detection wave, the first feedback wave, the second detection wave and the second feedback wave, wherein the first detection wave and the second detection wave are both electromagnetic waves;

the calculation module is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, an included angle $\theta_1$ when the first direction is anticlockwise rotated to the moving direction, and an included angle $\theta_2$ when the moving direction is anticlockwise rotated to the second direction;

the calculation module judges whether $\theta_1$ and $\theta_2$ are negative values, if the calculation module judges that $\theta_1$ or $\theta_2$ is a negative value, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, the included angle $\theta_1$ when the first direction is anticlockwise rotated to the moving direction, and the included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

8. The touch screen according to claim 7, wherein the electromagnetic waves are microwaves or optical waves.

9. The touch screen according to claim 7, wherein the predetermined angle is equal to 90 degrees.

10. The touch screen according to claim 7, each of the one or the plurality of touch identification devices corresponds to one touch point, and all the touch points are uniformly distributed on the touch screen.

11. A touch screen comprising one or more touch identification devices on the basis of Doppler effect, the touch identification device on the basis of Doppler effect comprises:
a first transceiving module used for transmitting a first detection wave along a first direction and receiving a first feedback wave formed from the first detection wave after being reflected by a touch body;
a second transceiving module used for transmitting a second detection wave along a second direction and receiving a second feedback wave formed from the second detection wave after being reflected by the touch body, an arrival angle from the first direction to the second direction being a predetermined angle, and the first direction and the second direction being intersected at a touch point of the touch body; and
a calculation module connected with the first transceiving module and the second transceiving module, and used for calculating a moving speed and a moving direction of the touch body at the touch point according to the first detection wave, the first feedback wave, the second detection wave and the second feedback wave, wherein
the first detection wave and the second detection wave are both electromagnetic waves;
the calculation module is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, an included angle $\theta_1$ when the first direction is anticlockwise rotated to the moving direction, and an included angle $\theta_2$ when the moving direction is anticlockwise rotated to the second direction;
the calculation module judges whether $\theta_1$ and $\theta_2$ are greater than 360 degrees, if the calculation module judges that $\theta_1$ or $\theta_2$ is greater than 360 degrees, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, the included angle $\theta_1$ when the first direction is anticlockwise rotated to the moving direction, and the included angle $\theta_2$ when the moving direction is anticlockwise rotated to the second direction;
wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

12. The touch screen according to claim 11, wherein the electromagnetic waves are microwaves or optical waves.

13. The touch screen according to claim 11, wherein the predetermined angle is equal to 90 degrees.

14. The touch screen according to claim 11, each of the one or more touch identification devices corresponds to one touch point, and all the touch points are uniformly distributed on the touch screen.

15. A touch identification method on the basis of Doppler effect comprising:
transmitting a first detection wave along a first direction and receiving a first feedback wave formed from the first detection wave after being reflected by a touch body, by a first transceiving module;
transmitting a second detection wave along a second direction and receiving a second feedback wave formed from the second detection wave after being reflected by the touch body, by a second transceiving module, an arrival angle from the first direction to the second direction being a predetermined angle, and the first direction and the second direction being intersected at the touch point of the touch body; and
calculating a moving speed and a moving direction of the touch body at the touch point according to the first detection wave, the first feedback wave, the second detection wave and the second feedback wave by a calculation module connected with the first transceiving module and the second transceiving module, wherein
the first detection wave and the second detection wave are both electromagnetic waves;
the step of calculating a moving speed and a moving direction of the touch body at the touch point according to the first detection wave, the first feedback wave, the second detection wave and the second feedback wave by a calculation module connected with the first transceiving module and the second transceiving module comprises:
the calculation module is used for, according to the following formula:

$$f_3 = f_1 * \frac{\sqrt{1 - \frac{v^2}{c^2}}}{1 + \frac{v * \cos\theta_1}{c}};$$

-continued $$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, an included angle $\theta_1$ when the first direction is anticlockwise rotated to the moving direction, and an included angle $\theta_2$ when the moving direction is anticlockwise rotated to the second direction;

the calculation module judges whether $\theta_1$ and $\theta_2$ are negative values, if the calculation module judges that $\theta_1$ or $\theta_2$ is a negative value, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, the included angle $\theta_1$ when the first direction is anticlockwise rotated to the moving direction, and the included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

16. The touch identification method on the basis of Doppler effect according to claim 15, wherein the electromagnetic waves are microwaves or optical waves.

17. The touch identification method on the basis of Doppler effect according to claim 15, wherein the predetermined angle is equal to 90 degrees.

18. A touch identification method on the basis of Doppler effect comprising:
transmitting a first detection wave along a first direction and receiving a first feedback wave formed from the first detection wave after being reflected by a touch body, by a first transceiving module;
transmitting a second detection wave along a second direction and receiving a second feedback wave formed from the second detection wave after being reflected by the touch body, by a second transceiving module, an arrival angle from the first direction to the second direction being a predetermined angle, and the first direction and the second direction being intersected at the touch point of the touch body; and
calculating a moving speed and a moving direction of the touch body at the touch point according to the first detection wave, the first feedback wave, the second detection wave and the second feedback wave by a calculation module connected with the first transceiving module and the second transceiving module, wherein
the first detection wave and the second detection wave are both electromagnetic waves;
the step of calculating a moving speed and a moving direction of the touch body at the touch point according to the first detection wave, the first feedback wave, the second detection wave and the second feedback wave by a calculation module connected with the first transceiving module and the second transceiving module comprises:
the calculation module is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0 + 360°;$$

calculating the moving speed v, an included angle $\theta_1$ when the first direction is anticlockwise rotated to the moving direction, and an included angle $\theta_2$ when the moving direction is anticlockwise rotated to the second direction;

the calculation module judges whether $\theta_1$ and $\theta_2$ are greater than 360 degrees, if the calculation module judges that $\theta_1$ or $\theta_2$ is greater than 360 degrees, then the calculation module determines that the calculated $\theta_1$ and $\theta_2$ are invalid calculation results, and is used for, according to the following formula:

$$f_3 = f_1 * \frac{\sqrt{1 - \frac{v^2}{c^2}}}{1 + \frac{v * \cos\theta_1}{c}};$$

$$f_4 = f_2 * \frac{\sqrt{1 - \frac{v^2}{c^2}}}{1 + \frac{v * \cos\theta_2}{c}}; \text{ and}$$

$$\theta_1 + \theta_2 = \theta_0;$$

calculating the moving speed v, the included angle $\theta_1$ when the first direction is anticlockwise rotated to the moving direction, and the included angle $\theta_2$ when the moving direction is anticlockwise rotated to the second direction;

wherein, $f_1$ is the frequency of the first detection wave, $f_2$ is the frequency of the second detection wave, $f_3$ is the frequency of the first feedback wave, $f_4$ is the frequency of the second feedback wave, $\theta_0$ is the predetermined angle, c is transmission speeds of the electromagnetic waves, and $f_1$ is unequal to $f_2$.

19. The touch identification method on the basis of Doppler effect according to claim 16, wherein the electromagnetic waves are microwaves or optical waves.

20. The touch identification method on the basis of Doppler effect according to claim 18, wherein the predetermined angle is equal to 90 degrees.

* * * * *